United States Patent [19]
Chun

[11] Patent Number: 6,072,828
[45] Date of Patent: Jun. 6, 2000

[54] TIMING RECOVERY APPARATUS AND METHOD USING EQUALIZER AND APPARATUS FOR JUDGING LAST DATA

[75] Inventor: Ji-yong Chun, Seoul, Rep. of Korea

[73] Assignee: Samsung Electronics Co., Ltd., Kyungki-do, Rep. of Korea

[21] Appl. No.: 08/990,983

[22] Filed: Dec. 15, 1997

[30]  Foreign Application Priority Data

Dec. 13, 1996 [KR]  Rep. of Korea ....................... 96-65514

[51] Int. Cl.[7] ..................................... H03H 7/30
[52] U.S. Cl. ........................... 375/229; 375/341; 375/355
[58] Field of Search .................. 375/229, 262, 375/341, 355; 333/18; 360/65; 714/395

[56]  References Cited

U.S. PATENT DOCUMENTS

| 5,450,457 | 9/1995 | Ito et al. .................................... 375/355 |
| 5,490,091 | 2/1996 | Kogan et al. ............................. 364/554 |
| 5,757,855 | 5/1998 | Strolle et al. ............................. 375/262 |
| 5,822,143 | 10/1998 | Cloke et al. .............................. 360/65 |

*Primary Examiner*—Amanda T. Le
*Assistant Examiner*—Dac V. Ha
*Attorney, Agent, or Firm*—Kile, McIntyre, Harbin & Lee; Eugene M. Lee

[57]  ABSTRACT

An apparatus for recovering timing using an equalizer of an E2PR4ML method and a method therefor and a last data judging apparatus. The timing recovery apparatus includes a sampling unit for sampling a reproduced signal and an equalizing unit for filtering the signal sampled by the sampling unit so as to output as a target signal E2PR4ML for detecting a timing error signal using the target signal output from the equalizing unit, phase synchronizing the detected timing error signal, and providing the phase-synchronized signal as a clock signal of the sampling unit. The timing recovery apparatus also includes a feedback filter using predetermined binary data as an input, an adder for adding the output signal of the feedback filter to the output signal of the equalizing unit and for outputting a new target signal, a data judging unit for detecting binary data on the basis of the new target signal and for generating quaternary data from the detected binary data, and a timing recovery unit for recovering timing by calculating the timing error of the sampling clock using the output signal of the data judging unit.

11 Claims, 5 Drawing Sheets

TIMING RECOVERY APPARATUS AND METHOD USING EQUALIZER AND APPARATUS FOR JUDGING LAST DATA

BACKGROUND OF THE INVENTION

1. Field of the Invention

The present invention relates to a timing recovery apparatus using an equalizer of an E2PR4ML method and a method therefor and an apparatus for judging last data and, more particularly, to a timing recovery apparatus for providing effective and stable timing to a sampling unit using an E2PR4ML signal which is a target signal of a magnetic recording equalizer and a method therefor and an apparatus for judging last data using a new target signal generated by the timing recovery apparatus.

2. Description of Related Art

A PR4ML method is an equalizer method currently used in a magnetic recording channel method to deal with high density recording. During a super-high density recording, an E2PR4ML equalizing method is used since there are limitations in the performance of a system that uses the PR4ML method. Since the E2PR4ML equalizing method has a frequency characteristic that is more similar to the channel characteristic during super-high recording than the conventional PR4ML equalizing method, noise amplification in an equalizer output decreases. Accordingly, it is possible to obtain a system having better performance. The operation of a timing recovery apparatus for a recovering sampling clock, however, is much more unstable in the E2PR4ML method than in the PR4ML method. This is because a method of using the output value of the equalizer and a threshold detection value with respect to the output value is employed in a PRML affiliated timing recovery apparatus. Specifically, the number of data levels in the output of the equalizer is 3 in the case of the PR4ML method, and the number of data levels in the output of the equalizer is 7 in the case of the E2PR4ML method. Therefore, the probability of error of the threshold detection value is much higher in the case of the E2PR4ML method than in the case of the PR4ML method. Accordingly, the operation of the timing recovery apparatus using the threshold detection value of the E2PR4ML method becomes unstable.

Figure 1:
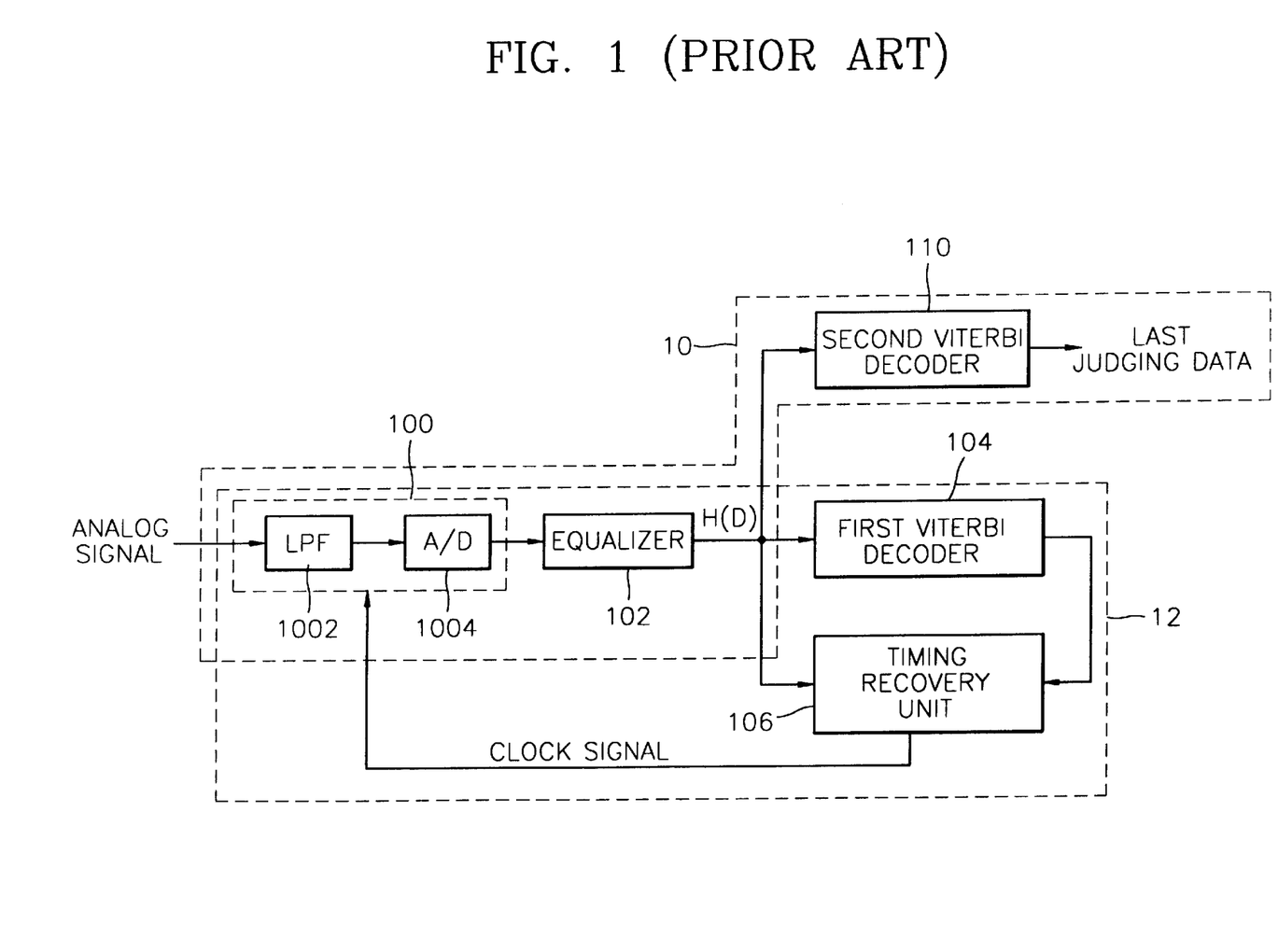
FIG. 1 shows a conventional timing recovery apparatus using an equalizer of an E2PR4ML method and a last data judging apparatus using a target signal generated by the timing recovery apparatus.

FIG. 1 shows a conventional timing recovery apparatus using the E2PR4ML method and an apparatus for judging last data using a target signal generated by the timing recovery apparatus. Reference numeral 10 denotes an apparatus for judging last data. Reference numeral 12 denotes a timing recovery apparatus. Reference numeral 100 denotes a sampling unit for sampling a reproduced signal including a low-pass filter 1002 and an analog/digital (A/D) converter 1004. Reference numeral 102 denotes an equalizer for receiving a signal output from the sampling unit 100 and filtering it so as to output a target signal H(D) E2PR4ML. Reference numeral 104 denotes a first Viterbi decoder for judging data using the target signal H(D) of the equalizer 102. Reference numeral 106 is a timing recovery unit for detecting the timing error of the target signal using judged data output from the first Viterbi decoder 104, synchronizing a phase as much as the detected error signal, and providing the synchronized phase as a clock signal of the sampling unit 100. Reference numeral 110 denotes a second Viterbi decoder for judging last data using the target signal H(D) of the equalizer 102.

Continuously, the operations of the timing recovery apparatus 12 and the last data judging apparatus 10 shown in FIG. 1 will now be described.

The band of an input reproduced signal is restricted through a low-pass filter 1002. The input reproduced signal is converted into a digital signal through an analog/digital converter 1004 and is input to the equalizer 102. The E2PR4ML signal which is the target signal H(D) of the equalizer 102 is generated by filtering the signal input through the equalizer 102.

The operation of the timing recovery apparatus 12 using the E2PR4ML which is the target signal H(D) of the equalizer 102 generated as mentioned above follows. The timing recovery unit 106 detects the timing error of the sampling clock by receiving the output signal of the equalizer 102 and the output signal of the first Viterbi decoder 104, synchronizes a phase as much as the detected timing error, and provides the synchronized phase as a clock signal of the sampling unit 100.

The operation of the last data judging apparatus 10 for judging the last data using the E2PR4ML signal output from the equalizer 102 follows. The second Viterbi decoder 110 which receives the E2PR4ML which is the target signal H(D) of the equalizer 102 judges and outputs the last data.

However, since the timing recovery apparatus in the conventional E2PR4ML method stably operates in only a very narrow range, the timing recovery apparatus operates unstably when the timing error is greater than a predetermined degree. Accordingly, the timing error cannot be completely removed. Thus, the performance of the timing recovery apparatus in the E2PR4ML method is lower than in the PR4ML method.

It is difficult to safely employ the E2PR4ML method in a system since the performance of the timing recovery apparatus using the E2PR4ML method is much lower than in the PR4ML method. The E2PR4ML method, however, has much less noise amplification than the conventional PR4ML method and has been used as an equalizer in a high density magnetic recording channel or a communication channel in which inter-symbol interference is severe.

SUMMARY OF THE INVENTION

Accordingly, it is a first object of the present invention to provide a timing recovery apparatus by which a safer timing recovery operation can be performed by converting a target signal E2PR4ML of an equalizer into a new target signal and recovering a timing using the converted target signal in a magnetic recording and reproducing apparatus.

It is a second object of the present invention to provide a timing recovery method therefor.

It is still a third object of the present invention to provide an apparatus for judging last data using the new target signal of the timing recovery apparatus constructed as mentioned above.

To achieve the first object, there is provided a timing recovery apparatus comprising a sampling unit for sampling a reproduced signal and an equalizing unit for filtering the signal sampled by the sampling unit so as to be output as a target signal E2PR4ML for detecting a timing error signal using the target signal output from the equalizing unit, phase synchronizing the detected timing error signal, and providing the phase-synchronized signal as a clock signal of the sampling unit, the timing recovery apparatus comprising feedback filter means using predetermined binary data as an input, adding means for adding the output signal of the feedback filter to the output signal of the equalizing unit and for outputting a new target signal, data judging means for detecting binary data on the basis of the new target signal output from the adding means and for generating quaternary data from the detected binary data, and timing recovery unit for recovering timing by calculating the timing error of the sampling clock using the output signal of the data judging means.

In the present invention, the new target signal output from the adding means is represented in the pattern of H'(D)=1+2D.

In the present invention, the data judging means comprises a delay for delaying the output signal of the adding means by a predetermined time, a binary data detector for detecting the binary data by receiving the delay signal of the delay and the output signal of the adding means, and a quaternary data generator for generating quaternary data by the signal output from the binary data detector.

In the present invention, the binary data detector comprises a first delay for delaying the output signal of the adding means by one clock period, a second delay for delaying the output signal of the first delay by one clock period, a first adder for adding the output signal of the second delay to the output signal of the first adder, and a threshold decoder for receiving the output signal of the second adder, decoding the received signal, and outputting the result to the feedback filter.

In the present invention, the threshold decoder outputs +1 when the input signal is larger than 0 and −1 when the input signal is less than 0.

In the present invention, the quaternary data generator comprises a shift register for receiving and shifting the output signal of the binary data detector, a third delay for delaying the output signal of the shift register by one clock period, and a third adder for adding the output signal of the binary data detector to the output signal of the third delay and outputting the result to the timing recovery unit.

In the present invention, the feedback filter means comprises a fourth delay for delaying the binary data output from the binary data generator by one clock period, a shift register for receiving and shifting the output signal of the fourth delay, a fifth delay for delaying the output signal of the fourth delay by one clock period, and a fourth adder for adding the output signal of the shift register to the output signal of the fifth delay and outputting the result to the adding means.

In the present invention, the shift register multiplies the signal output from the binary data generator by two and shifts the multiplied result to the left by one bit.

To achieve the second object, there is provided a method for recovering a timing of a system using a target signal E2PR4ML in a reproduced signal processing apparatus for magnetic recording, comprising the steps of (a) sampling a reproduced signal, (b) filtering the signal sampled in step (a) so as to be output as the E2PR4ML target signal, (c) converting the E2PR4ML target signal output from the step (b) into a new target signal represented as H(D)=1+2D in which D denotes a one-sample delay, (d) receiving the new target signal output in the step (c), delaying it by a predetermined time, detecting binary data using the delayed new target signal and the target signal, and generating quaternary data from the detected binary data, and (e) calculating a timing error using the new delayed target signal output in the step (d) and the binary data, reconstructing timing, and providing the result as the clock of the sampling step (b).

To achieve the third object, there is provided a last data judging apparatus comprising a sampling unit for sampling a reproduced signal, an equalizing unit for filtering the signal sampled by the sampling unit so as to be output as a target signal E2PR4ML, and a first Viterbi decoder for receiving the signal output from the equalizing unit and judging last data, in a magnetic recording and reproducing signal processing apparatus, the last data judging apparatus comprising a feedback filter using predetermined binary data as an input, adding means for adding the output signal of the feedback filter to the output signal of the equalizing unit and outputting a new target signal, data judging means for delaying the new target signal output from the adding means by a predetermined time, detecting the binary data on the basis of the new target signal, and generating quaternary data using the detected binary data, and a second Viterbi decoder for judging the last data using the new delayed target signal output from the data judging means.

In the present invention, the first Viterbi decoder and the second Viterbi decoder are selected according to a user's operating mode selection.

BRIEF DESCRIPTION OF THE DRAWING(S)

The above objectives and advantages of the present invention will become more apparent by describing in detail a preferred embodiment thereof with reference to the attached drawings in which.

DESCRIPTION OF THE PREFERRED EMBODIMENTS

Hereinafter, the present invention will be described in more detail with reference to the attached drawings.

Figure 2:
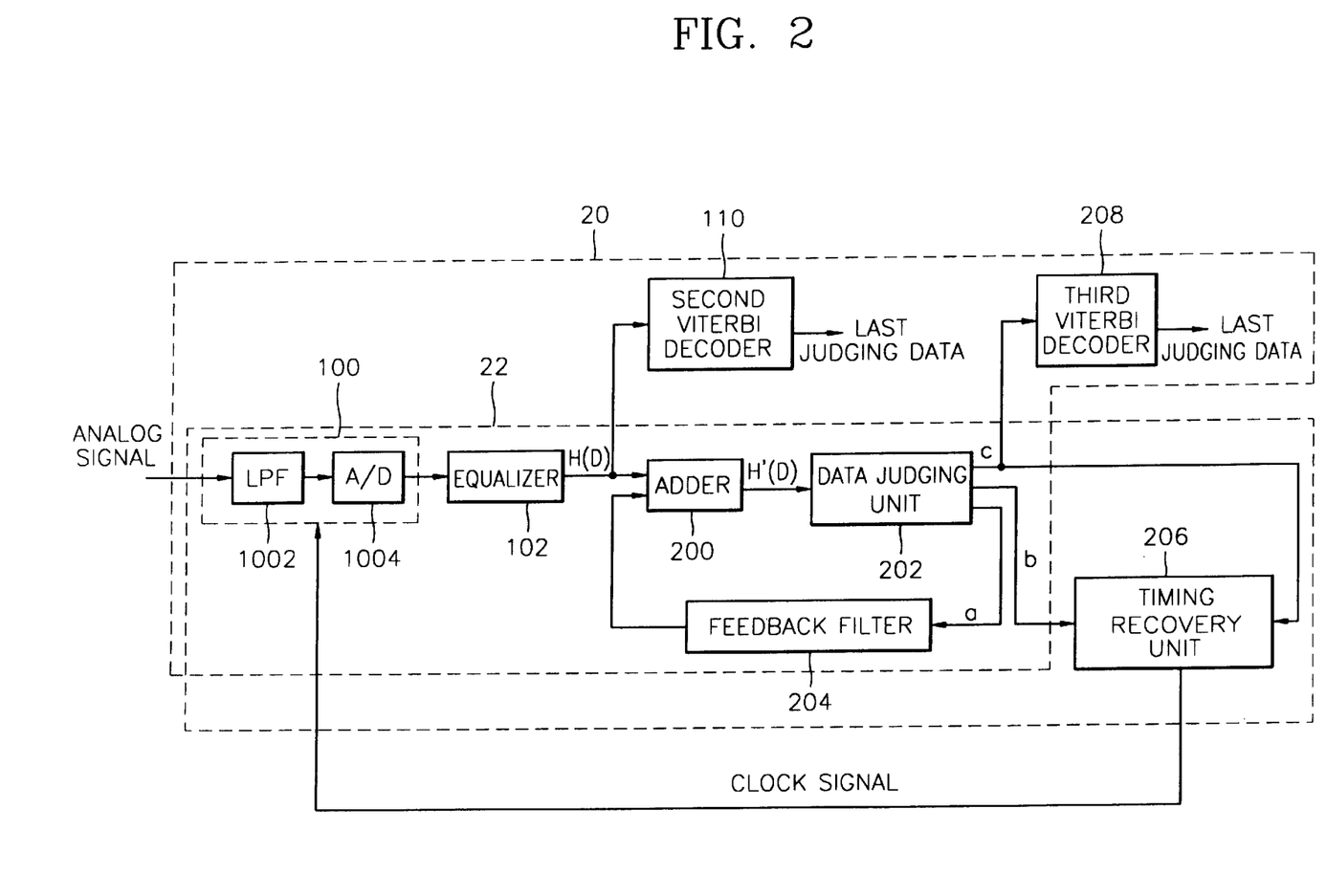
FIG. 2 shows a timing recovery apparatus and a last data judging apparatus according to the present invention in which E2PR4ML is used.

Referring to FIG. 2, a timing recovery apparatus and a last data judging apparatus according to the present invention in which a E2PR4ML method is used is shown. Reference numerals 22 and 20, respectively, denote a timing recovery apparatus and a last data judging apparatus according to the present invention. Here, the timing recovery apparatus 22 and the last data judging apparatus 20 converts a target signal (E2PR4ML) H(D) of an equalizer 102 obtained by receiving and filtering a signal output from a sampling unit 100 for sampling a reproduced signal into a new target signal, recovers a timing using the new target signal, and judges the last data.

The timing recovery apparatus 22 according to the present invention includes a feedback filter 204 using predetermined binary data as an input, an adder 200 using the output signal H(D) of an equalizer 102 and the output signal of the feedback filter 204 as inputs, a data judging unit 202 for outputting binary data (a), quaternary data (b), and a signal (c) obtained by delaying the output signal H'(D) of the adder 200 by predetermined clock as an input, and a timing recovery unit 206 calculating the timing error of sampling clock, synchronizing the phase of the timing as much as the calculated error, and providing it as the clock of the sampling unit 100 using the signals b and c output from the data judging unit 202 as inputs.

An apparatus 20 for judging the last data using the new target signal output from the timing recovery apparatus 22 according to the present invention includes a third Viterbi decoder 208 for receiving the signal (c) output from the data judging unit 202 for receiving the new target signal.

Figure 3:
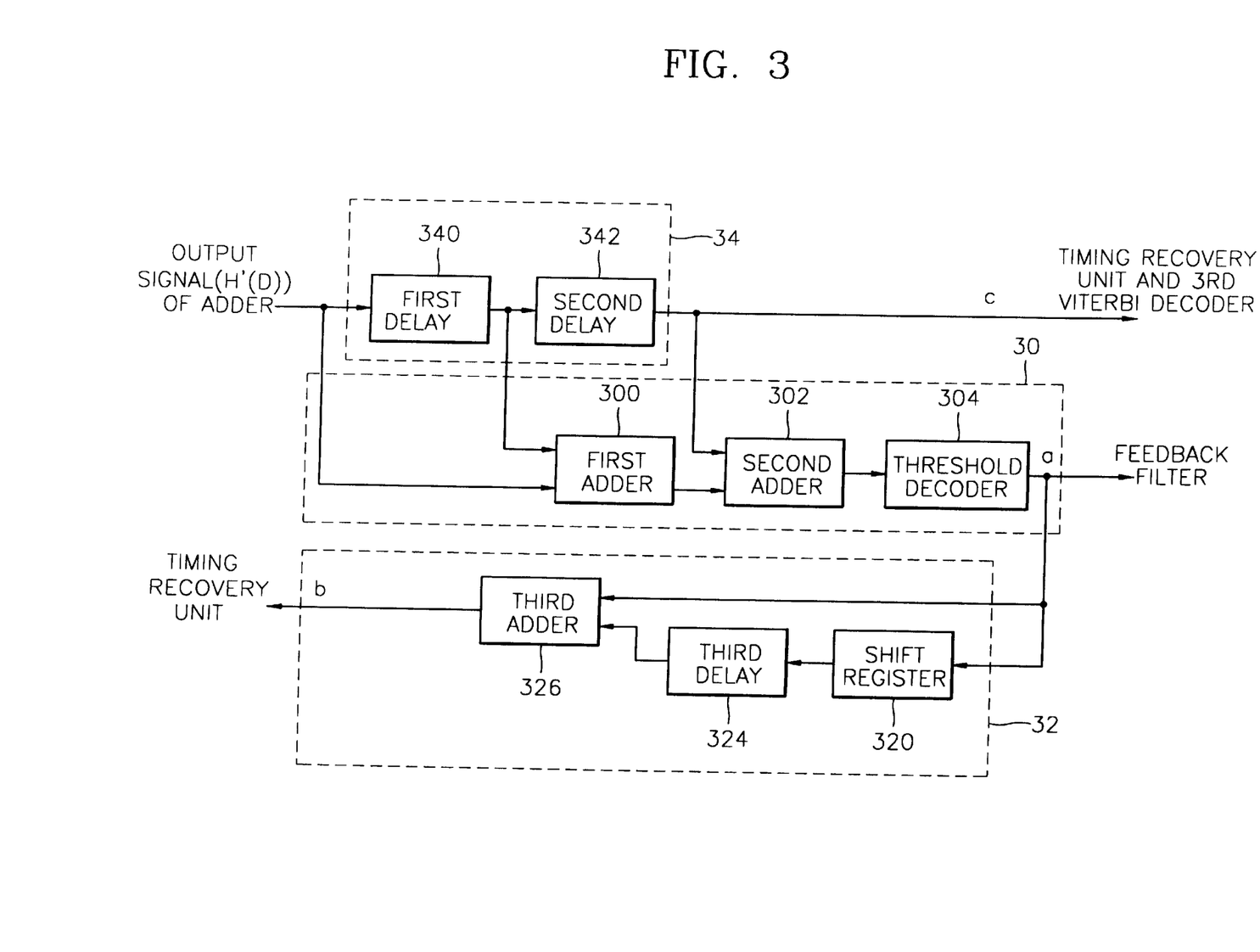
FIG. 3 shows a detailed structure of the data judging unit shown in FIG. 2.

FIG. 3 shows a detailed structure of the data judging unit 202 shown in FIG. 2. The data judging unit 202 includes a delay 34 for outputting the signal (c) obtained by delaying the signal H'(D) of the adder 200 by a predetermined amount of time, a binary data detector 30 for receiving a delay signal of the delay 34 and the output signal H'(D) of the adder 200 and detecting the binary data (a), and a quaternary data generator 32 for generating the quaternary data (b) using the binary data (a) output from the binary data detector 30. Here, the delay unit 34 includes a first delay 340 and a second delay 342. The output signal (c) of the second delay 342 is input to the third Viterbi decoder 208 and the timing recovery unit 206. The delay unit 34 includes a first delay 340 for delaying the output signal of the adder 200 by one clock period, and a second delay 342 for delaying the output of the first delay 340 by one clock period. The binary data detector 30 includes a first adder 300 using the output signal (H'(D)) of the adder 200 and the output signal of the first delay 340 as inputs, a second adder 302 using the output signal of the second delay 342 and the output signal of the first adder 300 as inputs, and a threshold decoder 304 using the output signal of the second adder 302 as an input. The output signal (a) of the threshold decoder 304 is input to the feedback filter 204. The quaternary data generator 32 includes a shift register 320 for receiving the output signal (a) of the binary data detector 30, a third delay 324 for delaying the output signal of the shift register 320 by one clock period, and a third adder 326 using the output signals of the binary data detector 30 and the third delay 324 as inputs. The output signal (b) of the third adder 326 is input to the timing recovery unit 206.

Figure 4:
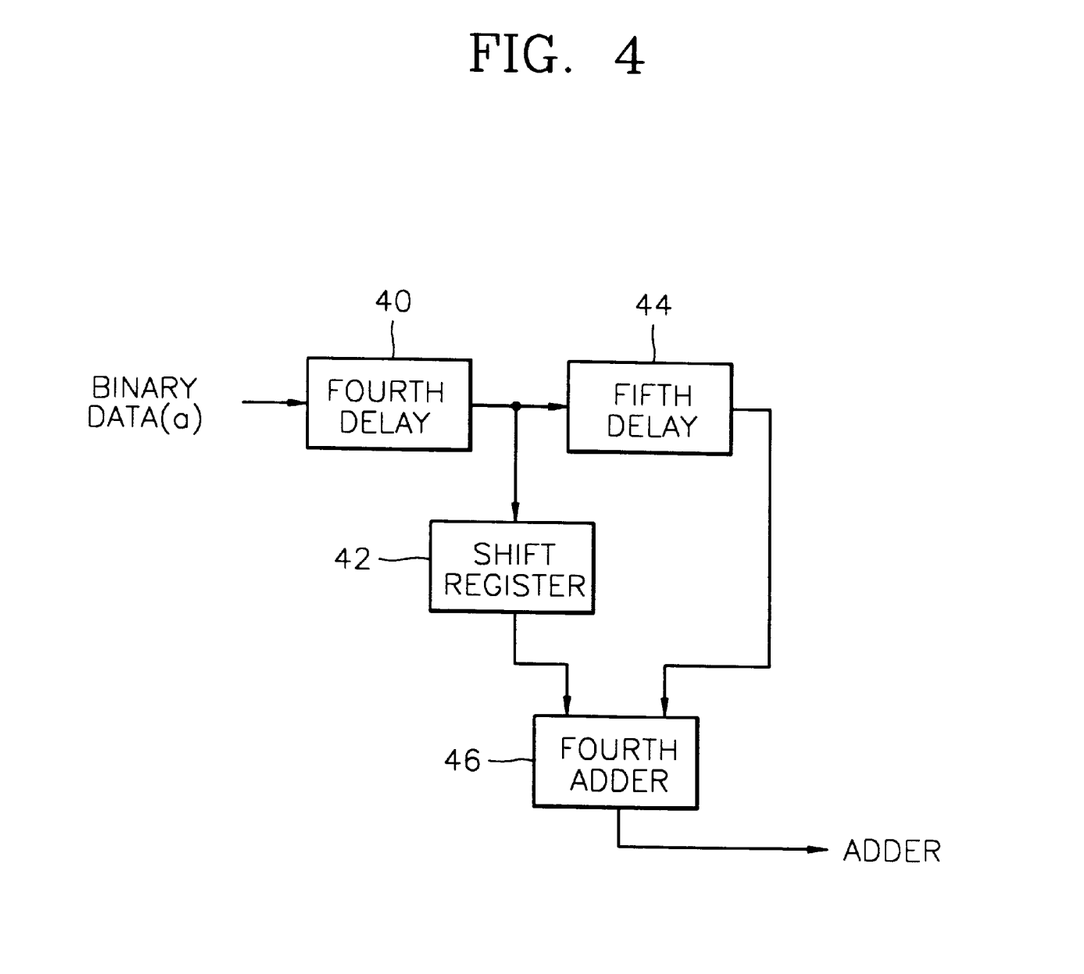
FIG. 4 shows a detailed structure of the feedback filter shown in FIG. 2.

FIG. 4 shows a detailed structure of the feedback filter 204 shown in FIG. 2. The feedback filter 204 includes a fourth delay 40 for delaying the binary data (a) output from the binary data generator 30 by one clock period, a shift register 42 using the output signal of the fourth delay 40 as an input, a fifth delay 44 for delaying the output signal of the fourth delayer 40 by one clock period, and a fourth adder 46 using the output signals of the shift register 42 and the fifth delay 44 as inputs. The output signal of the fourth adder 46 is input to the adder 200.

The operations of the timing recovery apparatus and the last data judging apparatus according to the present invention will now be described.

In the present invention, the operation of the equalizer 102 is performed using the E2PR4ML signal as a target signal H(D) and then the feedback filter 204, the adder 200, and the data judging portion 202 operate in order to convert the target signal H(D) into a new target signal H'(D). Therefore, the number of levels of data is reduced, and the error rate of the detected data is significantly reduced over the conventional method. Accordingly, it is possible to perform a stable timing recovery operation.

As shown in FIG. 2, the band of an analog signal is restricted through a low-pass filter 1002. The analog signal is converted into a digital signal in an analog/digital converter 1004. The digital signal is input to the equalizer 102. The equalizer 102 filters the input digital signal so that the target signal E2PR4ML is output. Here, the target signal E2PR4ML is represented as a digital converted pattern of the following equation (1):

$$H(D)=1+2D-2D^3-D^4 \tag{1}$$

wherein, D means a one sample delay.

The output signal of the equalizer 102 as represented by equation (1) is input to the second Viterbi decoder 110 for judging the last data and is simultaneously input to the adder 200. Here, the target value of the second Viterbi decoder 110 aims at the E2PR4ML signal which is identical to equation (1).

Another input of the adder 200 is the output signal of he feedback filter 204. The adder 200 adds these two signals and outputs the result to the data judging unit 202. The data judging unit 202 detects the binary data (a) and outputs it to the feedback filter 204, generates the quaternary data (b) and outputs it to the timing recovery unit 206, and outputs the signal (c) obtained by delaying the output signal of the adder 200 to the third Viterbi decoder 208 and the timing recovery unit 206. Here, the value of the binary data (a) is {+1, −}. The feedback filter 204 outputs the output signal obtained by filtering the binary data (a) to the adder 200. The timing recovery unit 206 detects the timing error using the binary data (a) and the output signal (c) of the data judging unit 202, synchronizes the phase as much as the extracted timing error, and provides it as the clock of the sampling unit 100. The third Viterbi decoder 208 judges the last data using the output signal (c) of the data judging unit 202 as an input. Here, the target value of the third Viterbi decoder 208 is aimed at outputting a new target signal as expressed by the following equation (2), unlike the second Viterbi decoder 110.

$$H(D)=1+2D \tag{2}$$

The new target signal of equation (2) has an advantage in that it can be realized at high speed with a much simpler Viterbi decoder than the target signal represented by equation (1). However, the third Viterbi decoder 208 has a relatively higher processing speed but a relatively lower performance than the second Viterbi decoder 110. Therefore, the second Viterbi decoder 110 can be used in the case where high performance is preferred over high processing speed, and the third Viterbi decoder 208 can be used in the case where high processing speed is preferred over high performance. The data judging unit 202 uses the present output $Q_K$, and the previous outputs $Q_{K-1}$, and $Q_{K-2}$ of the adder 200 in order to judge the binary data (a). The binary data (a) output at this time is $a_{K-2}$. The relationship between an ideal $Q_K$ and the binary data (a) $a_{K-2}$ is shown in the following equations (3), (4), and (5).

$$Q_K=a_K+2a_{K-1} \tag{3}$$

$$Q_{K-1}=a_{K-1}+2a_{K-2} \tag{4}$$

$$Q_{K-2}=a_{K-2}+2a_{K-3} \tag{5}$$

It is possible to easily detect $a_{K-2}$ using an RLL(1,7) code in the relationship shown in equations (3), (4), and (5). Namely, it is possible to detect $a_{K-2}$ by obtaining only $Q_K+Q_{K-1}+Q_{K-2}$ and judging whether the obtained value is greater or less than 0. The result is confirmed through the following table 1. Here, $R_K$ denotes $Q_K+Q_{k-1}+Q_{K-2}$, and the relationship between $R_K$ and $a_{K-2}$ is shown in the following equation (6).

$$R_K = a_K + 3a_{K-1} + 3a_{K-2} + 2a_{K-3} \quad (6)$$

TABLE 1

| ORDER | $R_K$ | $a_{K-3}$ | $a_{K-2}$ | $a_{K-1}$ | $a_K$ |
|---|---|---|---|---|---|
| 1 | 9 | 1 | 1 | 1 | 1 |
| 2 | 7 | 1 | 1 | 1 | -1 |
| 3 | 3 | 1 | 1 | -1 | 1 |
| 4 | 1 | 1 | 1 | -1 | -1 |
| 5 | 3 | 1 | -1 | 1 | 1 |
| 6 | 1 | 1 | -1 | 1 | -1 |
| 7 | -3 | 1 | -1 | -1 | 1 |
| 8 | -5 | 1 | -1 | -1 | -1 |
| 9 | 5 | -1 | 1 | 1 | 1 |
| 10 | 3 | -1 | 1 | 1 | -1 |
| 11 | -1 | -1 | 1 | -1 | 1 |
| 12 | -3 | -1 | 1 | -1 | -1 |
| 13 | -1 | -1 | -1 | 1 | 1 |
| 14 | -3 | -1 | -1 | 1 | -1 |
| 15 | -7 | -1 | -1 | -1 | 1 |
| 16 | -9 | -1 | -1 | -1 | -1 |

After the orders 3, 5, 6, 11, 12, and 14 are removed from the above Table 1, since they do not meet an RLL(1,7) code condition, $a_{K-2}$ is determined to be +1 when $R_K$ is greater than 0, and $a_{K-2}$ is determined to be -1 when $R_K$ is less than 0.

The detailed operation of the data judging unit 202 shown in FIG. 3 is as follows in the case of using the above-mentioned RLL(1,7) code. The delays 340, 342, and 324 delay each input signal by one clock period. The input signal is the output signal of the adder 200 shown in FIG. 2, and the transfer function of the signal is as shown in equation (2) in an ideal case. The signal is input to the delay 340 and the first adder 300. The first adder 300 adds the input signal to the output signal of the delay 340 and outputs the added result to the input of the second adder 302. The output signal of the second delay 342 is output to the other input of the second adder 302. The second adder 302 adds the two input signals and outputs the added result to the threshold decoder 304. The threshold decoder 304 outputs +1 when the input signal is greater than 0 and outputs -1 when the input signal is less than 0 and at the same time outputs the result to the third adder 326 and the shift register 320.

The shift register 320 is for multiplying the input signal (a) by a factor of 2 and shifts the input signal (a) to the left by one bit. The output of the shift register 320 becomes the other input of the third adder 326 through the third delay 324. The third adder 326 adds the two input signals and outputs the added result as the quaternary data (b). The quaternary data (b) is a signal corresponding to a case in which the signal of equation (2) is judged to be a threshold signal. The relationship between the binary data (a) and the quaternary data (b) is shown in the following Table 2. Here, $a_K$ and $X_K$ respectively means the binary data and the quaternary data.

TABLE 2

| $a_K$ | $a_{K-1}$ | $X_K (= a_K + 2a_{K-1})$ |
|---|---|---|
| -1 | -1 | -3 |
| -1 | +1 | +1 |
| +1 | -1 | -1 |
| +1 | +1 | +3 | wherein, the quaternary data (b) has only one value among {-3, -1, +1, +3}.

A detailed description of the operation of the feedback filter 204 shown in FIG. 4 follows. The input signal (a) which is the binary data detected from the data judging unit 202 shown in FIG. 2 has only the values {+1, -1} and is input to the fourth delay 40. The output signal of the fourth delay 40 is input to the fifth delay 44 and the shift register 42. The shift register 42 multiplies the output signal of the fourth delay 40 by a factor of 2 and shifts it to the left by one bit without using a multiplier. The fourth adder 46 adds the output signal of the shift register 42 to the output signal of the fifth delay 44 and generates the result as an output signal. The relationship between the binary data (a) which is an input signal and the feedback output signal ($B_K$) is shown in the following equation (7).

$$B_K = 2a_{K-3} + a_{K-4} \quad (7)$$

Therefore, a new target signal having a pattern as described by equation (2) is obtained by adding the signal equalized to E2PR4ML of equation (1) to the feedback filter output signal ($B_K$) via the adder 200 of FIG. 2.

The timing recovery unit 206 according to the present invention which is shown in FIG. 2 may have the same structure as that of the conventional timing recovery unit 106 shown in FIG. 1. Since the characteristics of the signals input to the respective timing recovery units are different from each other even if the two timing recovery units have the same structure, it is possible to gain advantages through the method provided in the present invention.

Figure 5:
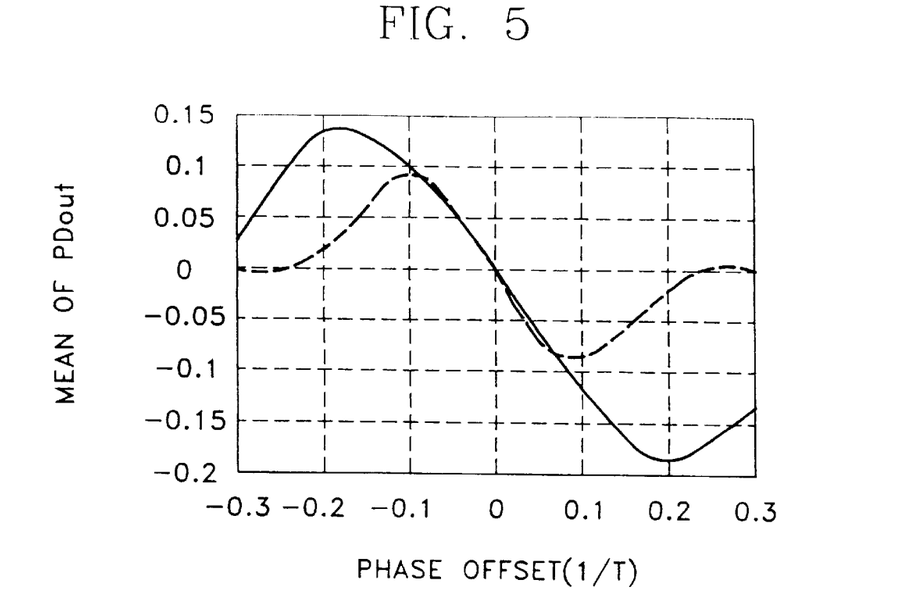
FIG. 5 is a graph showing a comparison of the performance of a timing recovery method according to the present invention with that of a conventional timing recovery method.

The performance of the timing recovery method according to the present invention is compared with that of the conventional timing recovery method in FIG. 5. The averages of phase comparison outputs of the respective phase offsets are compared in the timing recovery unit. Here, it is preferable that the characteristic of the average value is linear with respect to a wide phase offset.

The curve marked with a dashed line in FIG. 5 is a resultant waveform with respect to a conventional timing recovery method using an output signal filtered as the E2PR4ML target signal and data judged with respect to the signal. The curve marked with a solid line is the resultant waveform with respect to the timing recovery method in which the method provided in the present invention is used. As shown in FIG. 5, while the curve marked with the dashed line is linear with respect to the phase offset of about ±10%, the curve marked with the solid line which is the result of the method provided in the present invention is linear with respect to the phase offset of about ±20%. Therefore, it is noted that much more excellent performance can be obtained in the method of the present invention compared with the conventional method.

Figure 6:
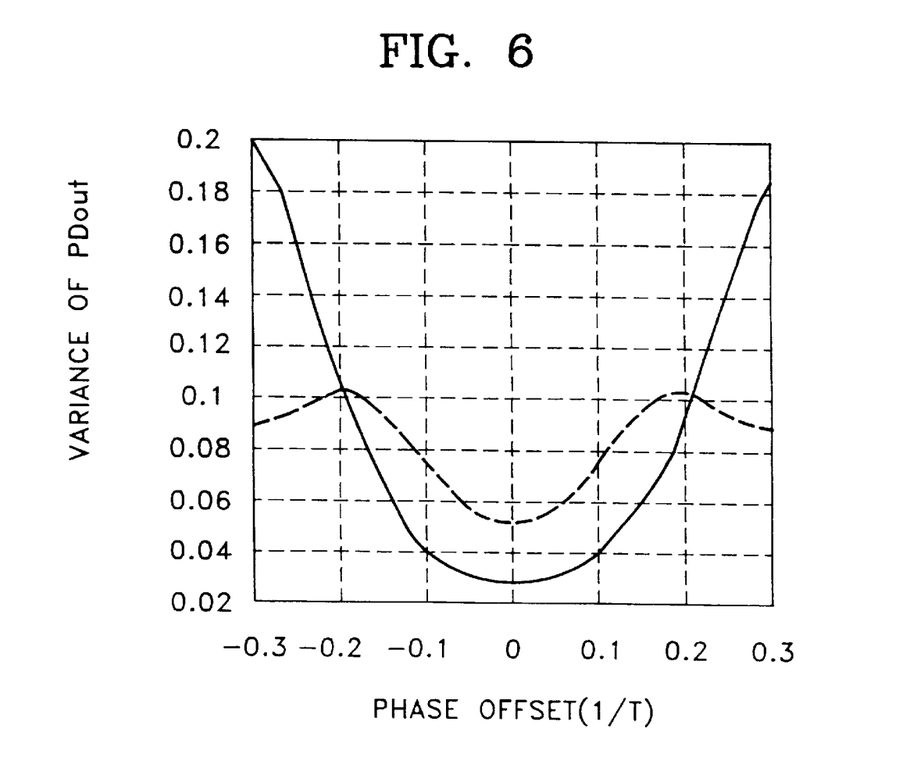
FIG. 6 is another graph showing a comparison of the performance of a timing recovery method according to the present invention with that of a conventional timing recovery method.

FIG. 6 compares the performance of the timing recovery method according to the present invention with respect to that of the conventional timing recovery method. The dispersion values of the phase comparison outputs of the respective offsets are compared to each other in the timing recovery units. Here, the method is estimated to be preferable as the dispersion value is smaller with respect to a wide phase offset.

The curve marked with the dashed line as shown in FIG. 6 is a resultant waveform with respect to a conventional timing recovery method using an output signal filtered as the E2PR4ML target signal and data judged with respect to the signal. The curve marked with a solid line is the resultant waveform with respect to the timing recovery method in which the method provided in the present invention is used. As shown in FIG. 6, it is noted that the curve marked with the solid line which is the result of the method provided in the present invention has a smaller dispersion value than that of the curve marked with the dashed line which is the result of conventional method in a phase offset range of about ±20%.

Therefore, as shown in FIGS. 5 and 6, it is noted that the timing recovery method provided in the present invention is more stable and excellent than the conventional timing recovery method.

The above-mentioned present invention can be used for a high density magnetic recording apparatus in which the equalizer of the E2PR4ML method is appropriate since a timing jitter may lessen therein. The present invention can be applied to all the systems using the equalizer of the E2PR4ML method in other communication channels.

According to the timing recovery apparatus in which the equalizer of the E2PR4ML method according to the present invention is used and the method therefor and the final data judging apparatus, it is possible to improve the performance of the system by reducing timing noise included in a sampling clock, extracting an accurate timing error, and generating the sampling clock and to simplify a circuit by simplifying the target signal output from the equalizer through the feedback filter and the adder when judging the final data. Accordingly, the processing speed becomes faster.

What is claimed is:

1. A timing recovery apparatus comprising:
   a sampling means for sampling a reproduced signal;
   an equalizing means for filtering the signal sampled by the sampling means so as to be output as a target signal E2PR4ML
   a feedback filter means using predetermined binary data as an input;
   an adding means for adding the output signal of the feedback filter to the output signal of the equalizing means and for outputting a new target signal;
   a data judging means for detecting binary data on the basis of the new target signal output from the adding means, generating quaternary data from the detected binary data, and delaying the new target signal by a predetermined time; and
   a timing recovery means for recovering timing by detecting a timing error signal using the quaternary data and the delayed new target signal from the data judging means, phase synchronizing the detected timing error signal, and providing the phase-synchronized signal as a clock of the sampling means.

2. A timing recovery apparatus as claimed in claim 1, wherein the new target signal output from the adding means is represented in the pattern of H'(D)=1+2D, wherein D denotes a one-sample delay.

3. A timing recovery apparatus as claimed in claim 1, wherein the data judging means comprises:
   a delay unit for delaying the output signal of the adding means by a predetermined time;
   a binary data detector for detecting the binary data by receiving the delayed signal of the delay unit and the output signal of the adding means; and
   a quaternary data generator for generating quaternary data by a signal output from the binary data detector.

4. A timing recovery apparatus as claimed in claim 3, wherein:
   the delay unit comprises a first delay for delaying the output signal of the adding means by one clock period and a second delay for delaying the output signal of the first delay by one clock period; and
   the binary data detector comprises a first adder for adding the output signal of the first delay to the output signal of the adding means, a second adder for adding the output signal of the second delay to the output signal of the first adder, and a threshold decoder for receiving the output signal of the second adder, decoding the received signal, and outputting the result to the feedback filter means.

5. A timing recovery apparatus as claimed in claim 4, wherein the threshold decoder outputs +1 when the input signal is greater than 0 and −1 when the input signal is less than 0.

6. A timing recovery apparatus as claimed in claim 3, wherein the quaternary data generator comprises:
   a shift register for receiving and shifting the output signal of the binary data detector;
   a delay for delaying the output signal of the shift register by one clock period; and
   an adder for adding the output signal of the binary data detector to the output signal of the delay and outputting the result to the timing recovery means.

7. A timing recovery apparatus as claimed in claim 1, wherein the feedback filter means comprises:
   a first delay for delaying the binary data by one clock period;
   a shift register for receiving and shifting the output signal of the first delay;
   a second delay for delaying the output signal of the first delay by one clock period; and
   an adder for adding the output signal of the shift register to the output signal of the second delay and outputting the result to the adding means.

8. A timing recovery apparatus as claimed in claim 6, wherein the shift register multiplies the signal output from the binary data detector by a factor of two and shifts the multiplied result to the left by one bit.

9. A method for recovering timing of a system using a target signal E2PR4ML in a reproduced signal processing apparatus for magnetic recording, comprising the steps of:
   A. sampling a reproduced signal;
   B. filtering the signal sampled in step A so as to be output as a E2PR4ML target signal;
   C. converting the E2PR4ML target signal output from step B into a new target signal represented by a formula, H'(D)=1+2D, in which D denotes a one-sample delay;
   D. receiving the new target signal output in step C, delaying the new target signal by a predetermined amount of time, detecting binary data using the delayed new target signal and the new target signal, and generating quaternary data from the detected binary data; and
   E. calculating a timing error using the delayed new target signal output in step D and the quaternary data, reconstructing timing, and providing the result as a clock of the sampling step A.

10. A last data judging apparatus in a magnetic recording and reproducing signal processing apparatus, comprising:
   a sampling unit for sampling a reproduced signal;
   an equalizing unit for filtering the signal sampled by the sampling unit so as to be output as a target signal E2PR4ML;
   a first Viterbi decoder for receiving the signal output from the equalizing unit and judging last data;
   a feedback filter using predetermined binary data as an input;

adding means for adding the output signal of the feedback filter to the output signal of the equalizing unit and outputting a new target signal;

data judging means for delaying the new target signal output from the adding means by a predetermined time, detecting the binary data on the basis of the new target signal, and generating quaternary data using the detected binary data; and a second Viterbi decoder for judging the last data using the delayed new target signal output from the data judging means.

11. The last data judging apparatus of claim 10, wherein the first Viterbi decoder and the second Viterbi decoder are selected according to a user's operating mode selection.

* * * * *